(No Model.)  2 Sheets—Sheet 1.

W. R. BAKER & H. E. PRIDMORE.
HARVESTER.

No. 275,977. Patented Apr. 17, 1883.

WITNESSES
Wm A. Skinkle.
Geo. W. Breck.

INVENTORS
William R. Baker.
Henry E. Pridmore.
By their Attorneys
Parkinson & Parkinson (No Model.) 2 Sheets—Sheet 2.

W. R. BAKER & H. E. PRIDMORE.
HARVESTER.

No. 275,977. Patented Apr. 17, 1883.

WITNESSES
Wm A. Skinkly.
Geo W. Breck.

INVENTORS
William R Baker
Henry E Pridmore

By their Attorneys
Parkinson & Parkinson

UNITED STATES PATENT OFFICE.

WILLIAM R. BAKER AND HENRY E. PRIDMORE, OF CHICAGO, ILLINOIS, ASSIGNORS TO THE McCORMICK HARVESTING MACHINE COMPANY, OF SAME PLACE.

HARVESTER.

SPECIFICATION forming part of Letters Patent No. 275,977, dated April 17, 1883.

Application filed September 19, 1882. (No model.)

*To all whom it may concern:*

Be it known that we, WILLIAM R. BAKER and HENRY E. PRIDMORE, of Chicago, in the county of Cook and State of Illinois, have invented certain new and useful Improvements in Harvesters, of which the following is a specification.

Our improvement relates particularly to that class of harvesters known as "one-wheel," and the special type which we have chosen for illustration is a single-wheel reaper—that is, a machine in which the grain, after being gathered by the reel, severed by the cutters, and laid on the platform, is swept off in gavels and delivered on the stubble to be collected and bound by workmen following after the team; but it will be understood that the various devices herein employed are capable, either as they are described or with slight modification, of being applied to a harvester having an elevator for the side delivery of the gavels, or to a mower having no platform; and the said invention consists in means for the vertical and tipping adjustment of the platform and finger-bar or of the finger-bar alone, substantially such as hereinafter described, and in various accessory combinations and details of construction to such end.

Figure 1:
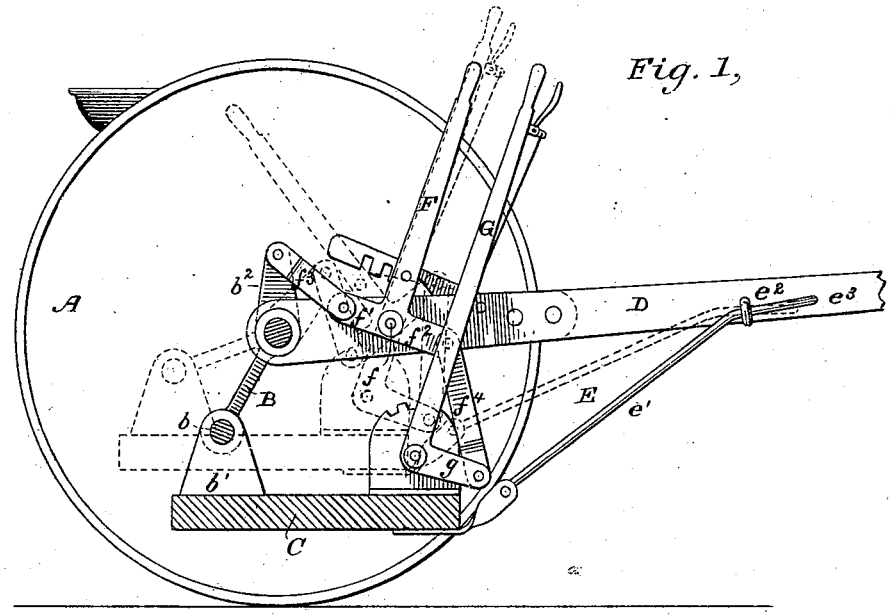
Figure 2:
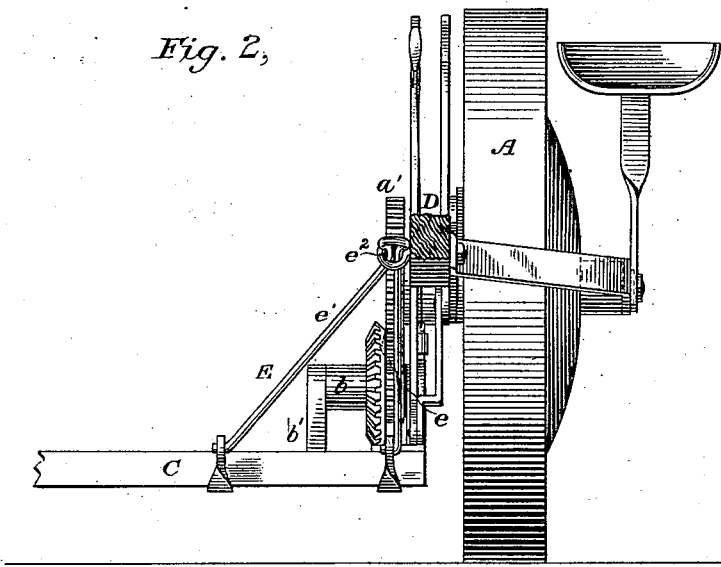
Figure 3:
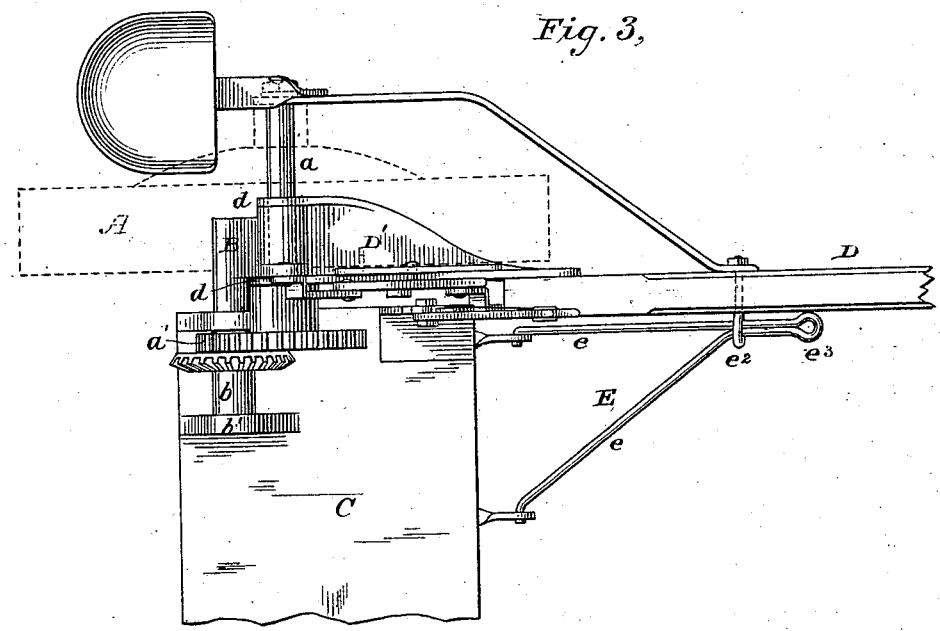
Figure 4:
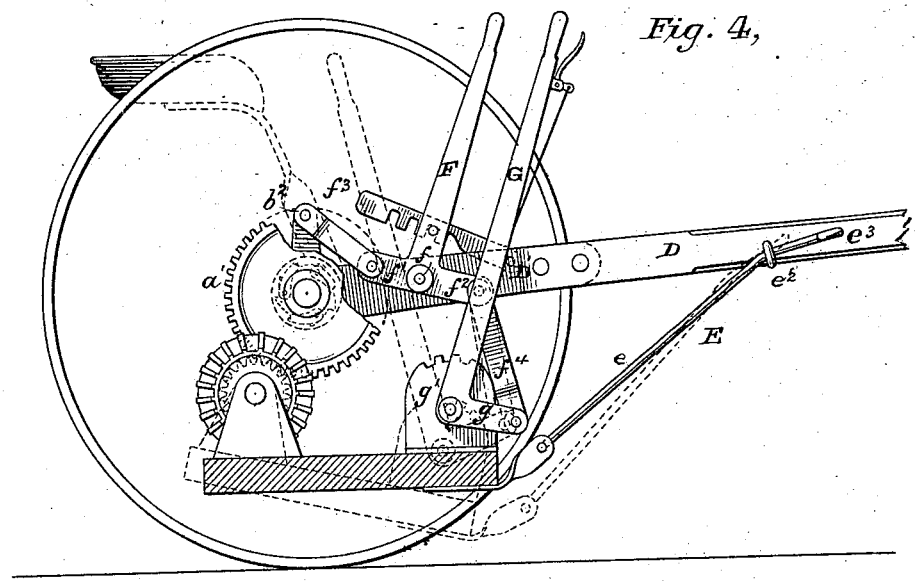

In the drawings, Figure 1, indicating in dotted lines the movement of the platform in its vertical adjustment, is an elevation from the platform side, with the latter in section, of a machine embodying our invention. Fig. 2 is a front elevation of said machine; Fig. 3, a top plan view; and Fig. 4, a grain side elevation, the platform again being sectioned and the tipping adjustment indicated in dotted lines.

A is the main wheel, which, for economy of space, is made flaring or dishing in shape, and $a$ is the main axle, to which this wheel is preferably keyed, driving by means of a clutch or backing-ratchet the main gear $a'$, mounted loosely upon the inner end. The radius-bar B, curved or shaped to coincide with the re-entrant spokes or web of said wheel, is sleeved upon the axle between the main wheel and main gear, and at its free end is connected by means of a sleeve with the prime pinion-shaft $b$, mounted in brackets $b'$ upon the platform C, the inner end of which is brought close to the wheel. The draft-tongue D is pivoted upon the axle or upon hubs extending from the sleeve of said radius-bar by means of a casting, $D'$, bolted to said tongue and rigid therewith, and forming, in effect, hounds $d$, one on each side of the radius-bar, and the inner one entering the recess in the side of the wheel, so that a firm connection will be made.

Hinged to the front of the platform is a metallic frame, E, composed of two bars, one of which, $e$, is parallel or substantially parallel with the vertical plane of the draft-tongue, and the other, $e'$, set at an angle to the first to reach to a point at or near the inside shoe or divider, where its pivotal connection with the platform is made, both bars meeting and running parallel with each other when they reach the side of the tongue, and being confined thereto by a keeper, $e^2$, which allows them to play longitudinally thereof. In practice these bars may be made of a single rod of metal bent in the form shown and described, and having at the primary bend or apex an enlargement, $e^3$, which prevents their escape from the keeper. This frame serves to counteract the twist, strain, or lateral thrust upon the platform, and to hold it at the proper angle to the draft-tongue, and its play within the keeper is to accommodate or compensate for the adjustment of the platform, as will hereinafter appear.

A lever, F, is pivoted to the draft-tongue, or to the hound-casting attached thereto, at a point, $f$, having two arms, $f'$ and $f^2$, projecting laterally on either side of the pivot. To the first arm is pivotally connected a link, $f^3$, jointed to an arm, $b^2$, projecting from the radius-bar above or in front of the axle, and to the second arm is also pivotally connected a link, $f^4$, which in turn is jointed to a crank-arm, $g$, from a lever, G, pivoted to a segment, $g'$, upon the front inner corner of the platform, and provided with a controllable dog or equivalent means to latch into a rack on said segment. The lever F will likewise be arranged to latch into a segmental rack on the draft-tongue, by which it is supported, or, as shown, may be locked in its various adjustments by means of a rack-arm pivoted to the tongue and arranged to take over a lateral pin or offset from the shank of the lever. The outer end of the platform will be supported, as usual, upon a caster-wheel, and any suitable means may be employed to retain it in position or to cause it to follow automatically the adjustments of the inner end—as, for instance, a crank-shaft bearing the caster in an arm at its outer end next to the divider, and having another arm at its inner end connected directly with the main axle by a link or radius-bar, substantially as described in an application for Letters Patent of the United States filed concurrently herewith by Henry E. Pridmore. With this construction, supposing it is desired to raise and lower the platform without materially disturbing its horizontality, the lever F will be moved in one direction or the other, thereby, through its link-connection with the arm from the radius-bar, rocking the latter upon the main axle and raising or lowering the rear of the platform, and at the same time, by its connection with the lever G, pivoted to the bracket on the front of the platform and locked in its rack against motion, concurrently raising or lowering said front, the proportion of the lever-arms to each other being such that this movement will be co-ordinate at front and rear; but if it is desired to merely tip the platform upon a fixed vertical adjustment, the lever F, hereinafter called the "raising and lowering lever," will be left untouched and held against movement by its rack, while the lever G—the tipping-lever—will be unlatched and moved upon its pivot, thereby either lifting the front of the platform toward the draft-tongue, to which the other lever is fastened, or dropping it away from said tongue to bring the finger-bar closer to the ground and at a changed angle thereto.

We claim—

1. The combination of the main wheel, its axle, the draft-tongue pivoted thereto, the platform adjustably supported from said axle and draft-tongue, and the steadying-frame hinged to the front of said platform, and playing within a keeper upon the draft-tongue to counteract the lateral thrust and hold the platform at a proper angle to said tongue.

2. The combination, substantially as hereinbefore set forth, of the main wheel, its axle, the draft-tongue pivoted to said axle, the platform suspended from the axle and tongue by adjustable supports, whereby it may be raised and lowered or tipped, and the steady-frame pivoted to the front of the platform, and playing at its forward end within a keeper upon the draft-tongue to compensate for the adjustments of the platform and to hold it at its proper angle to the draft-tongue.

3. The combination, substantially as hereinbefore set forth, of the main wheel, its axle, the draft-tongue pivoted to said axle, the radius-bar sleeved to the axle and supporting the rear inner corner of the platform, and a lever pivoted to the draft-tongue, and link connected with a forwardly-extending arm from the radius-bar to rock the latter upon the axle.

4. The combination, substantially as hereinbefore set forth, of the main wheel, its axle, the draft-tongue pivoted to said axle, the radius-bar sleeved to the axle and supporting the rear inner corner of the platform, a lever pivoted to the draft-tongue and having one lateral arm connected by a link with an arm from the radius-bar to rock the latter upon the axle, and a second lateral arm opposed to the first and connected with the front of the platform, whereby said platform may be raised and lowered without altering its horizontal plane by moving said lever.

5. The combination, substantially as hereinbefore set forth, of the main wheel, its axle, the draft-tongue pivoted to said axle, the platform, the radius-bar sleeved to the axle and connected with the rear of the platform, the arm from said radius-bar upon the opposite side of the axle, the link connecting said arm with the lateral arm from the raising and lowering lever pivoted to the draft-tongue in advance of the axle, the tipping-lever pivoted to a bracket on the front of the platform, and the link connecting an arm or crank of said tipping-lever with a second lateral arm from the raising and lowering lever, opposed to the first arm thereof.

6. The combination, substantially as hereinbefore set forth, of the main wheel, its axle, the draft-tongue pivoted to said axle, the radius-bar sleeved to the axle and connected with the prime pinion-shaft supported in brackets on the rear of the platform, an arm projecting from said radius-bar on the side of the axle opposed to the prime pinion-shaft, a link connecting said arm with the lateral arm from the raising and lowering lever pivoted upon the draft-tongue, and a second link connecting an opposite lateral arm of said lever with the front of the platform.

7. The combination, substantially as hereinbefore set forth, of the main wheel, its axle, the draft-tongue hinged to said axle, the main gear upon the axle, the seat-standard pivoted to the outer end of the axle and connected by a bar with the draft-tongue, the platform, the prime pinion-shaft supported in brackets at the rear thereof, the radius-bar connecting said prime pinion-shaft with the axle, the lever-arm on said radius-bar, the raising and lowering lever pivoted to the draft-tongue and connected by one lateral arm and a link with the lever-arm on said radius-bar, the tipping-lever pivoted to a segment on the front of the platform, a link connecting an arm from said tipping-lever with the second lateral arm on the raising and lowering lever, and the steady-frame pivoted to the front of the platform and playing at its forward end in a keeper on the draft-tongue.

WILLIAM R. BAKER.
HENRY E. PRIDMORE.

Witnesses:
JOHN V. A. HASBROOK,
JAS. H. SHIELDS.